(12) United States Patent
Gupta et al.

(10) Patent No.: US 10,817,609 B2
(45) Date of Patent: Oct. 27, 2020

(54) SECURE RECONFIGURATION OF HARDWARE DEVICE OPERATING FEATURES

(71) Applicant: Nvidia Corporation, Santa Clara, CA (US)

(72) Inventors: Apoorv Gupta, Santa Clara, CA (US);
Ryan Speiser, Santa Clara, CA (US);
Varun Kumar, Santa Clara, CA (US);
Tony Cheng, Santa Clara, CA (US);
Erik Zuroski, Saint Louis Park, MN (US)

(73) Assignee: Nvidia Corporation, Santa Clara, CA (US)

( * ) Notice: Subject to any disclaimer, the term of this patent is extended or adjusted under 35 U.S.C. 154(b) by 110 days.

(21) Appl. No.: 14/870,612

(22) Filed: Sep. 30, 2015

(65) Prior Publication Data

US 2017/0091458 A1 Mar. 30, 2017

(51) Int. Cl.
| | | |
|---|---|---|
| *G06F 21/57* | (2013.01) | |
| *H04L 9/32* | (2006.01) | |
| *G06F 21/74* | (2013.01) | |
| *G06F 21/76* | (2013.01) | |

(52) U.S. Cl.
CPC .............. *G06F 21/57* (2013.01); *G06F 21/74* (2013.01); *G06F 21/76* (2013.01); *H04L 9/3247* (2013.01); *G06F 2221/034* (2013.01)

(58) Field of Classification Search
CPC ... G06F 21/57; G06F 2221/034; H04L 9/3247
See application file for complete search history.

(56) References Cited

U.S. PATENT DOCUMENTS

| | | | | |
|---|---|---|---|---|
| 7,117,352 | B1 * | 10/2006 | Giles | G01R 31/31719 713/2 |
| 2002/0175698 | A1 * | 11/2002 | Goodman | G01R 31/31704 326/8 |
| 2004/0158742 | A1 * | 8/2004 | Srinivasan | G06F 21/10 726/4 |
| 2004/0204003 | A1 * | 10/2004 | Soerensen | G06F 21/73 455/550.1 |
| 2004/0230803 | A1 * | 11/2004 | Kuhls | G06F 21/33 713/176 |
| 2005/0033969 | A1 * | 2/2005 | Kiiveri | G06F 21/57 713/189 |
| 2007/0118880 | A1 * | 5/2007 | Mauro, II | G06F 21/79 726/4 |
| 2012/0054734 | A1 * | 3/2012 | Andrews | G06F 8/65 717/171 |
| 2013/0031369 | A1 * | 1/2013 | Balinsky | H04L 9/088 713/176 |
| 2014/0108755 | A1 * | 4/2014 | Lue | G06F 3/0619 711/162 |

(Continued)

*Primary Examiner* — Fahmida Rahman

(57) ABSTRACT

A secure reconfigurable operating mode system includes a hardware device having multiple operating modes and an operating mode selector that is coupled to the hardware device. The operating mode selector has a virtual fusing register that selects an operating mode for the hardware device and a security processor that enables a secure virtual fusing based on documented security files authorizing selection of the operating mode. A method of secure hardware device operating mode reconfiguration is also provided.

20 Claims, 2 Drawing Sheets

(56) References Cited

U.S. PATENT DOCUMENTS

2014/0157355 A1* 6/2014 Clancy, III .............. G06F 21/53
 726/1
2015/0052520 A1* 2/2015 Crowell .................. G06F 21/53
 718/1

* cited by examiner

SECURE RECONFIGURATION OF HARDWARE DEVICE OPERATING FEATURES

TECHNICAL FIELD

This application is directed, in general, to virtualization of a hardware device and, more specifically, to an operating mode selector, a method of secure hardware device operating mode reconfiguration and a secure reconfigurable operating mode system.

BACKGROUND

The creation of custom electronic products typically involves increased engineering and inventory costs due to designs being targeted toward specific applications and the requirement to deliver these different designs in a responsive timeframe, once completed. This process also may require an inventory projection for each design. In some cases, a more general or global electronic device (e.g., a graphics processing unit) may be designed to accommodate a range of applications, and the specific application required is selected during manufacturing of the device. This selection process may use electronic fusing circuits to permanently select a specific operating mode for the electronic device. While this approach may simplify the manufacturing process, it does not reduce the inventory projection issue since the electronic fusing is done earlier in a production pipeline and is permanent. Additionally, operating mode changes dictated by usage in the field cannot be accommodated. Therefore, what is needed in the art is an improved way to provide custom operating modes for an electronic device.

SUMMARY

Embodiments of the present disclosure provide an operating mode selector, a method of secure hardware device operating mode reconfiguration and a secure reconfigurable operating mode system.

In one embodiment, the operating mode selector includes a virtual fusing register coupled to a hardware device and configured to select an operating mode for the hardware device, and a security processor coupled to the virtual fusing register and configured to enable a secure virtual fusing based on documented security files authorizing selection of the operating mode.

In another aspect, the method of secure hardware device operating mode reconfiguration includes providing a hardware device having multiple operating modes, providing secure virtual fusing to select an operating mode for the hardware device, and enabling the secure virtual fusing based on documented security files that authorize selection of the operating mode.

In yet another aspect, the secure reconfigurable operating mode system includes a hardware device having multiple operating modes and an operating mode selector that is coupled to the hardware device. The operating mode selector has a virtual fusing register that selects an operating mode for the hardware device and a security processor that enables a secure virtual fusing based on documented security files authorizing selection of the operating mode.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Virtual machines (e.g., virtual computers) are gaining popularity, especially in cloud computing applications. In virtual computing, a virtual machine may act like a separate hardware computer having its own operating system and software, where the operating system and software executed on the virtual machine operate separately from underlying resources supporting the virtual machine. In cloud computing, this virtualization process allows improved processing of applications requiring large data sets or high data transfer rates, since they are performed locally on the virtual machine.

Embodiments of the present disclosure further support the concept of virtualization by allowing secure operating mode reconfiguration of hardware devices employed in an application. This secure reconfiguration may be initiated remotely and is protected through authorization provided by documented security microcode and files for hardware devices already deployed in the field (i.e., installed for use). Effectively, this secure reconfiguration allows for rebranding of a hardware device with regard to its operating mode.

Embodiments of the present disclosure may employ secure software downloads to allow an end user access to previously unauthorized operating modes of a device. Original equipment manufacturers (OEMs) may employ bulk licenses for customer applications or enterprise licenses may be employed using enterprise client software. Fixed licenses may be tied to a particular physical application, or floating licenses may be applied to multiple physical systems. The licensing may be extended to include one or more virtual devices operating from one or more physical devices.

For purposes of this disclosure, a multiple operating mode hardware device (i.e., a "universal device") is defined as one having at least a portion of its operating modes that are remotely selectable. An electronic fuse (i.e., an "eFuse") is defined as permanent fusing that provides selection of only one operating mode of an electronic device.

Virtual fusing is defined as fusing that provides a reconfigurable selection of an operating mode for a universal device. Additionally, the virtual fuse may be embodied in a secure register that is "write-protected" from central processing unit actions and can only be written into by a security processor that is presented with documented security files or license files. A virtual fusing register (i.e., a virtual fuse) loses its value on "chip reset" or a power-down condition, and therefore, needs to be written into every time it is reset or powered down. Virtual fuses may provide enablement of multiple operating modes of the universal device that are implemented in fixed function hardware or exposed by secure software operating on hardware.

Figure 1:
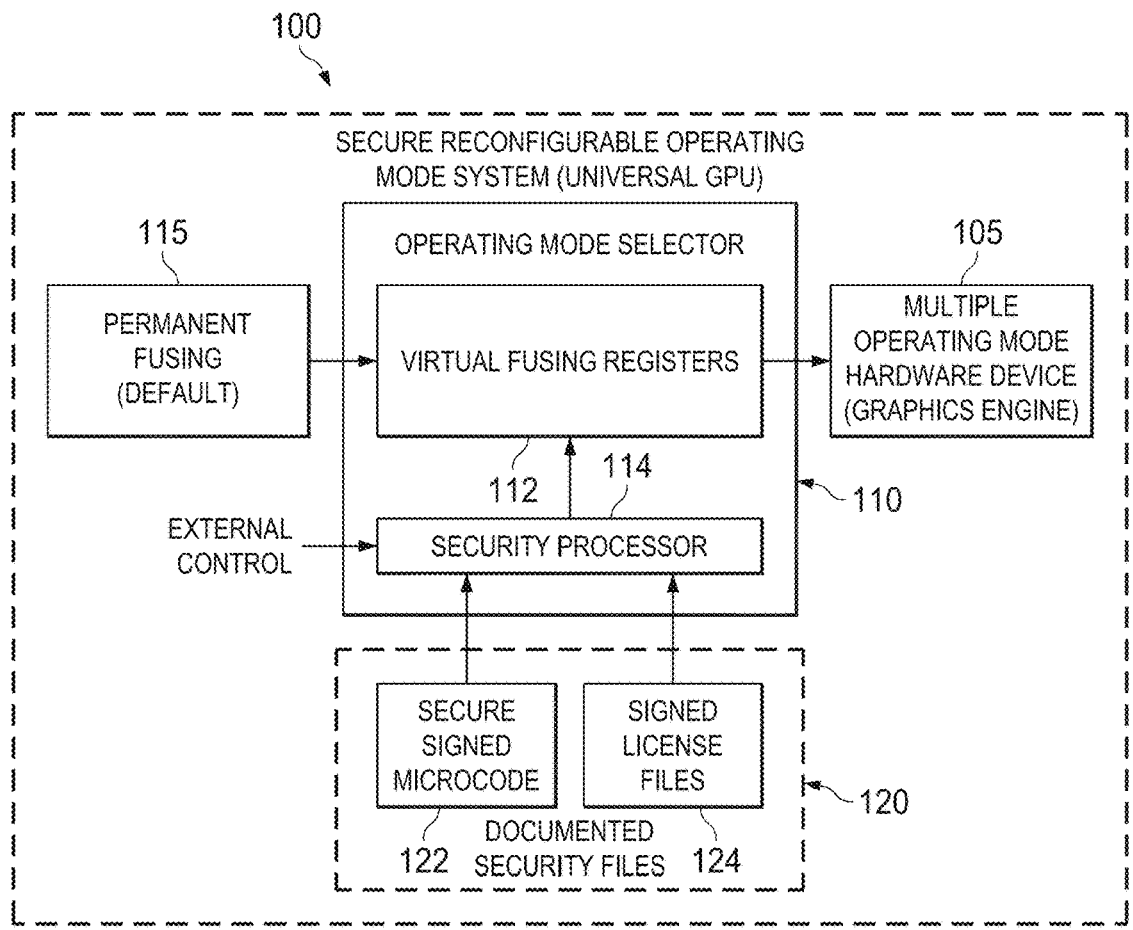
FIG. 1 illustrates an embodiment of a secure reconfigurable operating mode system constructed according to the principles of the present disclosure.

FIG. 1 illustrates an embodiment of a secure reconfigurable operating mode system, generally designated 100, constructed according to the principles of the present disclosure. The secure reconfigurable operating mode hardware system 100 includes a multiple operating mode hardware device 105, an operating mode selector 110, permanent fusing 115 and documented security files 120. The operating mode selector 110 includes virtual fusing registers 112 and a security processor 114. The documented security files 120 include secure signed microcode 122 and signed license files 124.

The operating mode selector 110 is coupled to the multiple operating mode hardware device 105 where the virtual fusing registers 112 provide secure virtual fusing to select an operating mode for the hardware device 105. Additionally, the security processor 114 is employed to enable the secure virtual fusing based on the documented security files 120, which authorize selection of the operating mode. One or more operating modes may be authorized by the documented security files 120. In this embodiment, the permanent fusing 115 is accommodated by the virtual fusing registers 110 to provide a default operating mode when other virtual operating modes are not selected.

Virtual fuses are effectively "secure storage" in the virtual fusing registers 112 of the operating mode selector 110 that can only be enabled or modified by the security processor 114, based on signed secure firmware. These registers are typically not accessible by other processors (e.g., a central processing unit), for security reasons. Here, the permanent fusing 115 typically employs one or more electronic fuses (eFuses) that are selected during manufacturing and cannot be altered. The permanent fusing 115 provides a default operating mode for the multiple operating mode hardware device 105 when another virtual fusing operating mode has not been activated by the security processor 114. The eFuse default operating mode can be overridden by the secure virtual fusing registers 112 when directed by the security processor 114.

The purpose of the security processor 114 is to protect the secure reconfigurable operating mode system 100 from unauthorized use or a malicious user. Therefore, the security processor 114 is only activated (secure mode) after successful verification of a signature attached to the secure signed microcode 122 using secret keys embedded in the security processor 114. Subsequently, the secure signed microcode 122 verifies a signature of the signed license file 124 before overriding existing operating mode configuration signals that are supplied by the secure virtual fusing registers 112 to the multiple operating mode hardware device 105. The security processor 114 contains hardware logic, which verifies the signature of the microcode before switching the security processor 114 to its secure mode.

In general, the signed license files 124 are custom licenses and are similar to certificates that are used for secure communications. These secure licenses may contain information about who issued the license, a public key, a version number, a size of the license and even a unique device or chip SKU identifier for application. Here, a group of end users can specify their unique device ID and their license would be issued for their specific device that would exclusively allow multiple users within a group to use the device. The secure licenses may also include the operating modes supported by the license, the features of each operating mode, expiration dates for each operating mode, a signature algorithm and a signature for the license file. Secure licenses are typically signed by secret keys that are delivered as part of the secure signed microcode.

More specifically, the signed license files 124 may be organized to include headers, extensions, ECIDs (electronic chip identifiers) that are unique for each device, or a device ID that would cover a whole class of devices. Additionally, they may indicate major operating modes through virtual fuses and minor operating mode adjustments through indication of register bit modifications. If there is only one index employed, that will be the common case for end users where only that index will be applied and there is no case or need for an external control input. Finally, a cryptographic signature (in this example, an RSA1024 signature statement) is included.

Table 1 below indicates an example license for a universal graphics processing unit (UGPU) employed as a secure reconfigurable operating mode system. The UGPU is licensed to operate in gaming, professional visualization or supercomputing applications.

TABLE 1

General Information Section - Main Header:

```
         version   = 0x20
 main struct size  = 44
    serialNumber   = 0x1000
        certSize   = 423
           type    = 9 : License certificate
        algoType   = 0x102 : Crypto: RSA  1K HASH: SHA256
           flag    = 1 : Extension present
        issuerID   = 1
     certOwnerID   = 100
       notBefore   = 53483fa4    2014/4/11    12:16:52
        notAfter   = 54358da4    2014/10/8    12:16:52
```

Extension Section - Extension Header:

Version: 10, Header Size = 10, Entry Header Size = 10, Entry Count = 7
 Extension Entry Type: 5
 First Extension Entry
   Extension payload: End User Corp 101
 Extension Entry Type: 6
   ECID Hash: 3461726064
c6c045e4976eb49d42c1c43af0365106d1d5680ee02a9ac81c5fd454
 Extension Entry Type: 7
   Extension Usage: UGPU
     GPU Major Operating Mode: 1 (Gaming)
     Minor Operating Mode: 0
     Register Override Number: 0, Feature Table Version: 0
 Extension Entry Type: 7
   Extension Usage: UGPU
     GPU Operating Mode: 2 (Professional Visualization)
     Minor Operating Mode: 0
     Register Override Number: 0, Feature Table Version: 0
 Extension Entry Type: 7
   Extension Usage: UGPU
     GPU Major Operating Mode: 2 (Professional Visualization)
     Minor Operating Mode: 1
     Register Override Number: 2, Feature Table Version: 0
         Register Override:  reg addr:  0x21218   mask:  0xffffffe
  data:  0x1
         Register Override:  reg addr:  0x21218   mask:  0xffffffc
  data:  0x2
 Extension Entry Type: 7
   Extension Usage: UGPU
     GPU Major Operating Mode: 2 (Professional Visualization)
     Minor Operating Mode: 2

TABLE 1-continued

Register Override Number: 1, Feature Table Version: 1
 Professional Visualization V1: Features: 1
  Register Override:   reg addr:  0x21218   mask:   0xffffffc
data: 0x3
Extension Entry Type: 7
 Last Extension Entry
  Extension Usage: UGPU
   GPU Operating Mode: 3 (Supercomputing)
   Minor Operating Mode: 0
  Register Override Number: 0, Feature Table Version: 0
RSA1024 Signature:

8146b8406b83dc8be1667fd2c08863de3398f9b59524f21b53df35b182ca29
a445e777c41e3a83202e307ebb68e04c63d3f445adff1041853628b22c41
a05ebb620d6052b6831bd033ff286cf98012d645dc72a233ccf9fbe565682
f427b81f787d89b4ae239f99eb5a22747f44d0c4b33d8c9416a996fc418dd
42771041e5e8

Figure 2:
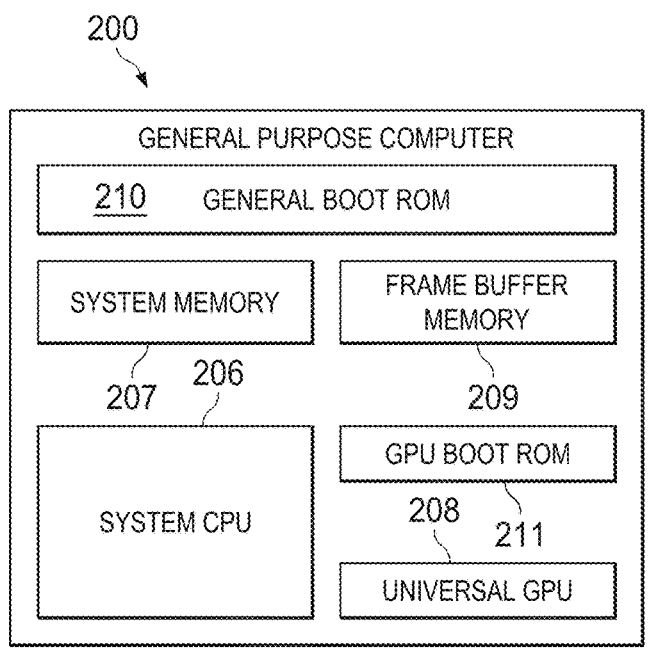
FIG. 2 illustrates a block diagram of an embodiment of a general purpose computer constructed according to the principles of the present disclosure.

FIG. 2 illustrates a block diagram of an embodiment of a general purpose computer, generally designated 200, constructed according to the principles of the present disclosure. The general purpose computer 200 may be employed as a local user device or in a network (e.g., as a cloud server shown in the embodiment of FIG. 3). The general purpose computer 200 is capable of rendering display information and may typically accommodate a wide variety of application software, which includes gaming, professional visualization and supercomputing virtualization applications.

The general purpose computer 200 includes a system central processing unit (CPU) 206, a system memory 207, a universal graphics processing unit (UGPU) 208 and a frame buffer memory 209. The UGPU 208 is an example of a secure reconfigurable operating mode system that is employed in the general purpose computer 200.

The system CPU 206 is coupled to the system memory 207 and the UGPU 208 to provide general computing processes and control of operations for the general purpose computer 200. The system memory 207 includes long term memory storage (e.g., a hard drive) for computer applications and random access memory (RAM) to facilitate computation by the system CPU 206. The UGPU 208 is further coupled to the frame buffer memory 209 to provide display and frame control information.

The general purpose computer 200 also includes a general boot ROM 210 and a GPU boot ROM 211. A typical organizational layout for the GPU boot ROM 211 provides an IFR (initialization from ROM) at the top of a ROM stack and legacy VBIOS (video BIOS) code may be next in the stack. UEFI (Unified Extensible Firmware Interface), which is an industry standard for system level interaction, may be provided that basically replaces VBIOS and BIOS standards. VBIOS extension and BIOS certificates may also be included, as appropriate, followed by ROM padding. Next, security processor microcode and license information defining authorized operating modes are provided in the ROM stack.

For a power on or restart condition, hardware will initially read straps and eFuse connections in parallel, where both are permanent connections corresponding to the UGPU 208 that can only be modified physically at the board level. The straps specify whether or not the GPU boot ROM 211 is attached. Since the GPU boot ROM 211 is provided, hardware will start executing an IFR (initialization from ROM). The IFR will load (bootstrap) the secure processor to verify signature of secure signed microcode using secret keys embedded in the secure processor. Once the microcode signature is verified, the secure processor will switch to the secure mode, and fetch license information from its location in the ROM. GPU firmware (IFR, VBIOS or UEFI) also resides in the GPU boot ROM 211.

If verification of the license information is successful, operation of the UGPU 208 is configured as specified in the license. Then, certificate and signature information for the video BIOS are verified. Upon successful verification, an appropriate PCIe (peripheral component interconnect express) indication is provided based on the configuration selected and specified in the license. If the verification process fails, the UGPU 208 will only operate in the default operating mode specified by the eFuses.

Figure 3:
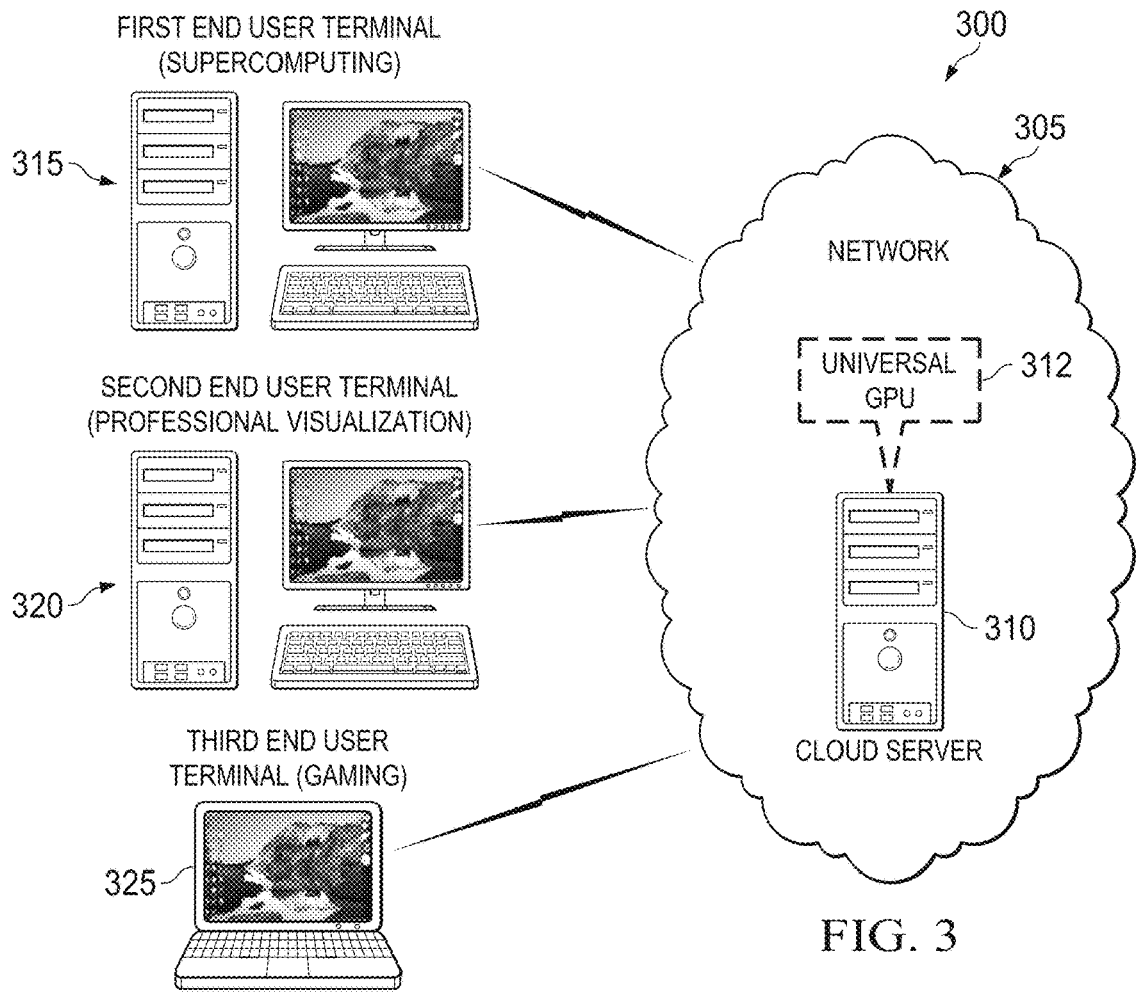
FIG. 3 illustrates an embodiment of a network computer arrangement employing cloud computing constructed according to the principles of the present disclosure.

FIG. 3 illustrates an embodiment of a network computer arrangement employing cloud computing, generally designated 300, constructed according to the principles of the present disclosure. The cloud computing arrangement 300 includes a network 305 having a cloud server 310 that employs a universal GPU (UGPU) 312, as an example of a secure reconfigurable operating mode system. The cloud computing arrangement 300 also includes first, second and third end user terminals 315, 320, 325, which may be selected from a range of end user devices depending on their applications.

The cloud computing arrangement 300 employing the UGPU 312 may be representative of enhanced virtualization services that provide differing SaaS (software as a service) capabilities to multiple end users. In this example, the first end user terminal 315 employs the cloud server 310 for supercomputing applications; the second end user terminal 320 employs the cloud server 310 for professional visualization applications and the third end user terminal 325 employs the cloud server 310 for gaming applications, as indicated. Depending on network and cloud server data rate capabilities and end user requirements, the virtually supported applications may be used separately or time shared.

Figure 4:
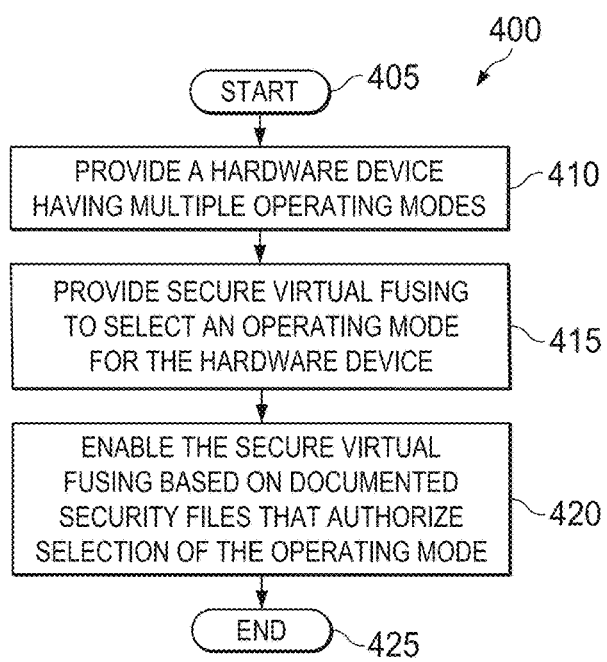
FIG. 4 illustrates a flow diagram of an embodiment a method of secure hardware device operating mode reconfiguration carried out according to the principles of the present disclosure.

FIG. 4 illustrates a flow diagram of an embodiment a method of secure hardware device operating mode reconfiguration, generally designated 400, carried out according to the principles of the present disclosure. The method 400 starts in a step 405 and, in a step 410, a hardware device having multiple operating modes is provided. Then, secure virtual fusing is provided to select an operating mode for the hardware device, in a step 415. The secure virtual fusing is enabled based on documented security files that authorize selection of the operating mode, in a step 420.

In one embodiment, the documented security files are selected from the group consisting of secure signed microcode and a signed license file. In another embodiment, the signed license file includes at least one reconfigurable operating mode selection for the hardware device. In yet another embodiment, the secure virtual fusing includes enabling a default operating mode selection that is provided by permanent fusing.

In yet another embodiment, the secure signed microcode and the signed license file are included in a read only memory (ROM) employed to initialize secure processing for the secure virtual fusing. In still another embodiment, the secure signed microcode includes a signed master key to allow verification of an authorizing signature of the signed license file. In yet a further embodiment, the authorizing signature is a cryptographic signature such as an RSA1024 signature. In still a further embodiment, the secure processor implements secret keys and hardware logic to verify the secure signed microcode before switching its processing mode to secure mode. The method 400 ends in a step 425.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. An operating mode selector for a virtual machine supported by a cloud server having a GPU, comprising:
a virtual fusing register configured to select an operating mode for the virtual machine that is independent of an operating system of the cloud server, wherein the cloud server provides different virtually supported applications and the virtual machine provides one of the different virtually supported applications in accordance with the operating mode; and
a security processor coupled to the virtual fusing register and configured to enable a secure virtual fusing based on documented security files authorizing selection of the operating mode for operating the virtual machine on the GPU, wherein the operating mode is one of two or more reconfigurable operating modes selectable from signed license files of the documented security files.

2. The selector as recited in claim 1 wherein the virtual fusing register is write-protected from actions of a central processing unit associated with the cloud server.

3. The selector as recited in claim 1 wherein the signed license files are each less than one kilobyte in size.

4. The selector as recited in claim 3 wherein the signed license files uniquely correspond to end user devices.

5. The selector as recited in claim 3 wherein the documented security files include secure signed microcode having a signed master key to allow verification of an authorizing signature of at least one of the signed license files.

6. The selector as recited in claim 1 wherein switching from the operating mode to another operating mode associated with one of the different virtually supported applications is performed separately from a booting operation of the operating system of the cloud server.

7. The selector as recited in claim 1, wherein the two or more reconfigurable operating modes provision different types of virtual machines supported by the GPU.

8. A method of operating mode reconfiguration for virtual machines operating on a cloud server, comprising:
receiving a request for operating a virtual machine on a GPU of the cloud server, wherein the GPU supports multiple operating modes for selection and operation of virtual machines, and the cloud server has an operation system separate from the multiple operating modes;
providing secure virtual fusing to select an operating mode for the virtual machine from the multiple operating modes; and
enabling the secure virtual fusing based on documented security files that authorize selection of the operating mode independent of the operation system of the cloud server, wherein the documented security files are included in a re-programmable read only memory (ROM) employed to initialize secure processing for the secure virtual fusing, wherein the operating mode is one of two or more reconfigurable operating modes selectable from at least one signed license file of the documented security files.

9. The method as recited in claim 8 wherein providing the secure virtual fusing includes enabling a default operating mode selection that is provided by permanent fusing.

10. The method as recited in claim 8 wherein the documented security files further include
secure signed microcode.

11. The method as recited in claim 8 wherein the multiple operating modes include a supercomputing mode, a professional visualization mode, and a gaming mode.

12. The method as recited in claim 10 wherein the secure signed microcode includes a signed master key to allow verification of an authorizing signature of the at least one signed license file.

13. The method as recited in claim 12 wherein the authorizing signature is a cryptographic signature.

14. The method as recited in claim 10, further comprising operating the GPU in a default operating mode when verification of the documented security files fails, wherein the default operating mode is provided by permanent fusing.

15. A secure reconfigurable operating mode system, comprising:
a universal GPU, of a cloud server, that supports different virtually supported applications according to different operating modes; and
an operating mode selector that is coupled to the universal GPU, including:
a virtual fusing register that selects the different operating modes for executing the different virtually supported applications, and
a security processor that enables a secure virtual fusing based on documented security files authorizing selection of the different operating modes separately from executing an operating system of the universal GPU, wherein the different operating modes are reconfigurable operating modes selectable from at least one signed license file of the documented security files.

16. The system as recited in claim 15 wherein the secure virtual fusing includes enabling a default operating mode selection that is provided by permanent fusing.

17. The system as recited in claim 15 wherein the documented security files further include
secure signed microcode.

18. The system as recited in claim 17 wherein the secure signed microcode and the at least one signed license file are included in a re-programmable read only memory (ROM) employed to initialize the security processor.

19. The system as recited in claim 17 wherein the secure signed microcode includes a signed master key to allow verification of an authorizing cryptographic signature of the at least one signed license file, and the security processor is activated after the verification.

20. The system as recited in claim 15 wherein at least two or more of the different operating modes are remotely selectable.

* * * * *

UNITED STATES PATENT AND TRADEMARK OFFICE
CERTIFICATE OF CORRECTION

Page 1 of 1

PATENT NO. : 10,817,609 B2
APPLICATION NO. : 14/870612
DATED : October 27, 2020
INVENTOR(S) : Apoorv Gupta et al.

It is certified that error appears in the above-identified patent and that said Letters Patent is hereby corrected as shown below:

In the Claims

In Claim 8, Line 53, before --providing secure-- insert --operating the virtual machine by--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*